United States Patent [19]

Strinning et al.

[11] 4,000,332

[45] * Dec. 28, 1976

[54] HIGH PROTEIN LOW CALORIE DAIRY SPREAD AND ITS PRODUCTION

[75] Inventors: Olof Bo Sven Strinning, Hagersten; Karl-Erik Thurell, Jakobsberg, both of Sweden

[73] Assignee: Mjolkcentralen, Ekonomisk Forening, Stockholm, Sweden

[ * ] Notice: The portion of the term of this patent subsequent to Nov. 25, 1992, has been disclaimed.

[22] Filed: Apr. 10, 1975

[21] Appl. No.: 567,012

Related U.S. Application Data

[63] Continuation of Ser. No. 424,733, Dec. 14, 1975, Pat. No. 3,922,376.

[30] Foreign Application Priority Data

Dec. 15, 1972  Sweden ................ 16387/72

[52] U.S. Cl. .................. 426/603; 426/585
[51] Int. Cl.² .......................... A23D 3/00
[58] Field of Search ............ 426/34, 42, 580, 583, 426/585, 603, 604

[56] References Cited

UNITED STATES PATENTS

| | | | |
|---|---|---|---|
| 1,247,483 | 11/1917 | Adams et al. | 426/603 |
| 2,156,036 | 4/1939 | Wilt | 426/603 X |
| 3,266,904 | 8/1966 | Duin et al. | 426/604 |
| 3,366,492 | 1/1968 | Voss et al. | 426/603 |

*Primary Examiner*—A. Louis Monacell
*Assistant Examiner*—R. A. Yoncoskie
*Attorney, Agent, or Firm*—Millen, Raptes & White

[57] ABSTRACT

High protein, low calorie dairy spread water-in-oil emulsions having a 20–65% aqueous phase are produced employing as the aqueous phase a protein concentrate having a 13–20% protein content and obtained as a by-product in the manufacture of butter from sour buttermilk, buffered at 6–7 with citrate and phosphate buffering salts, and as the fat phase butter oil optionally mixed with a polyunsaturated vegetable oil, emulsifying the aqueous phase into the fat phase at 38°–50° C., flash pasteurizing the emulsion, optionally adding flavoring agents before or after emulsifying and pasteurization, and then cooling the emulsion, first to 20°–14° while working the emulsion as it solidifies, and then to storage temperature, e.g., 12°–8° C.

4 Claims, 1 Drawing Figure

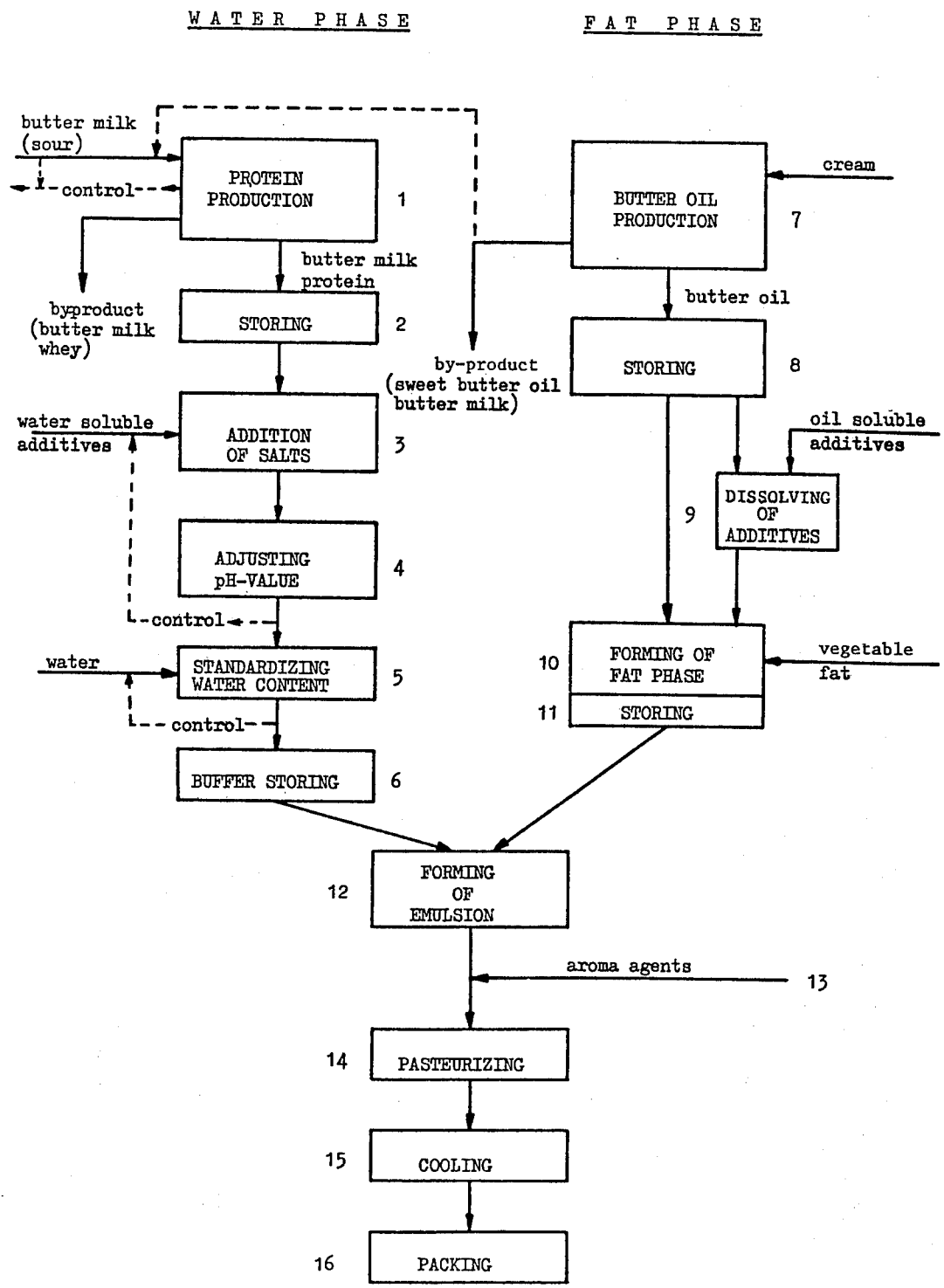

HIGH PROTEIN LOW CALORIE DAIRY SPREAD AND ITS PRODUCTION

This is a continuation of application Ser. No. 424,733, filed Dec. 14, 1973, now U.S. Pat. No. 3,922,376.

BACKGROUND OF THE INVENTION

This invention relates to a method of manufacturing high protein low calorie dairy-based spreads, in which a protein containing water phase and a fat phase are prepared separately and then mixed to form a water-in-oil emulsion.

The invention is particularly suited for the manufacture of edible fats which can be spread at refrigerator temperature and the invention will be described herein primarily with reference to the manufacture of dairy spreads having this property. However, the invention is not restricted to manufacture of such dairy spreads and may be employed in a number of different fields, as will be evident to those skilled in the art.

In a known method of manufacturing a low calorie dairy spread, a water phase is prepared, using skim milk as starting material, in which the protein is milk casein obtained by acid precipitation and the water phase is dispersed in the fat phase in a closed cooling and crystallization system so as to obtain a water-in-oil emulsion at a temperature at which the fat is beginning to crystallize. Prior to dispersing the water phase in the fat phase, the protein-containing water phase is subjected to a temperature of between 65° and 80° C. for 10 to 30 minutes.

This known method has some disadvantages, due primarily to the difficulty of obtaining a stable emulsion having a water phase content as high as 60% and of obtaining a product which is microbiologically stable.

SUMMARY OF THE INVENTION

According to this invention, a dairy spread having as its aqueous phase a protein concentrate from sour buttermilk, buffered with citrate and phosphate salts at a pH of 6–7 and emulsifying the aqueous phase into a fat phase while both are heated at a temperature at which the emulsion is molten, flash pasteurizing the molten emulsion, cooling the molten emulsion to below solidification temperature while mechanically working the emulsion, and thereafter further cooling the emulsion to storage temperature.

DESCRIPTION OF THE DRAWINGS

The invention is shown diagrammatically in the accompanying drawing by a flow scheme in which the left-hand vertical flow branch shows the manufacture of the water phase and the right-hand vertical flow branch shows the manufacture of the fat phase, the emulsion formation and the finishing of the product. In the flow scheme, the successive steps in the water phase manufacture are denoted 1–6, the steps of the fat phase manufacture are denoted 7–12 and the finishing steps are denoted 13–16.

DETAILED DISCUSSION

Preparation of the water phase

1. A suitable starting material for preparing the protein concentrate is sour buttermilk, which is commercially available as a by-product in butter or butter oil manufacture.

Sweet buttermilk may, if desired, be added to the starting sour buttermilk, as will be evident from the description of Step 7 below, provided it is first soured.

In preparing the starting protein concentrate, a low lactose content is imparted thereto with buttermilk whey being obtained as a by-product, which is removed from the process. The protein concentrate contains about 13–20% by weight protein, calculated on a wet weight basis. The protein concentrate usually has a relatively high amount of so-called membrane proteins, which have good emulsifying properties. The protein concentrate prepared in the above-described manner also has good water holding properties and is therefore particularly well suited for preparing emulsions of the water-in-oil type.

As indicated with the dotted arrows under Step 1, the state and degree of acidity of the starting concentrate is continuously checked, as is the ready concentrate in Step 4.

2. The protein concentrate prepared in Step 1 is transferred to a buffer storing station, i.e., a station where a sufficient volume is manufactured to ensure a continuous supply of the concentrate, from which the concentrate is successively removed for further treatment.

3. At Station 3, flavoring and buffering salts, preferably a mixture of common table salt, an alkaline mixture of citrates and phosphates, e.g., alkali metal citrates and phosphates, are added to the protein concentrate. The common table salt is added in an amount suitable for taste purposes. Both the citrates and the phosphates, bind the calcium in the protein, which give the proteins better water binding ability. The buffered protein concentrate, which previously had a pH of about 4.5 – 5, now has a pH usually of about 6 by the addition of the alkaline salts, so the product is still acidic after the addition of the said salts. The salts stabilize the pH and provide some buffer effect. Tinning agents like sorbic acid or sodium benzoate may be added at this point.

4. As necessary to further raise the pH value to between 6.0 and 7.0, alkali or an alkaline salt, e.g., NaOH, KOH, a basic ammonium salt, sodium carbonate, or the like, can be added at Station 4. It is also possible to use a basic ion exchange to raise the pH value. The pH is raised to prevent oxidation of the fat which may occur after the water phase has been emulsified in the fat phase and to further increase the water-holding property of the proteins. The pH value preferably is raised to 6.5 – 6.8. This adjustment of the pH value is very important for the continuous process, and in order to ensure that the adjusted pH value is the intended one, a metering control thereof is made as indicated with the dotted arrows.

5. When the pH value has been adjusted, the water content of the concentrate is standardized at Station 5, normally by adding an amount of water which gives a desired protein content to the concentrate within the range of 11–18%, e.g., 11–15%, usually about 12.4%. However, the standardization of the water content can also be achieved by evaporation. The temperature of the protein solution, i.e., the aqueous or water phase is kept at 38°–50° C, preferably 40°–43° C. At this station, the protein content of the standardized water phase and desirably also the temperature thereof is monitored.

6. In order to ensure a continuous supply thereof relative to the fat phase or lipid phase which is prepared parallelly with the water phase, the water phase obtained from Station 5 is stored as necessary in a buffer storing Station 6.

Preparation of the fat phase

7. In Station 7 butter oil is prepared from cream in a conventional known manner, producing butter oil having a fat content of up to 99.9%. The sweet buttermilk by-product which is obtained, leaves the process or may be used in the preparation of the protein concentrate in Station 1.

8. If necessary, the butter oil can be stored in buffer storing Station 8 when the rate of butter oil production exceeds consumption in the process.

9. At Station 9, a minor amount of the prepared butter oil can be used for dissolving such optional oil soluble food additives, e.g., dyestuffs, emulsifiers, etc., which may be desired in the final product. Very little, if any, emulsifiers are required, since the water phase contains proteins having good emulsifying properties as mentioned above. The amounts of such additives are regulated in a conventional manner.

10. The butter oil coming from Station 7 or 8, together with the oil which is provided with oil soluble additives, is mixed with any other oils which are intended to be a part of the final product. The butter oil preferably is mixed with one or more vegetable oils having a high content of polyunsaturated fats, e.g., soy oil, sunflower oil, or other vegetable oil having a high content of polyunsaturated fats. It may be noted that both the butter oil and the additive oils are unhardened oils, which is an advantaage. The additive oils are preferably added to such an extent that 10–50%, preferably 25–35%, by weight of the fat content of the fat phase is polyunsaturated fats. If desired, vitamins may be added at this stage, e.g., by using vitaminized soy oil. The temperature of the fat phase at this station is, like the water phase at Station 5, maintained at 38°–50° C., preferably 40°–43° C.

11. As needed, the mixed oils and fats are stored in a buffer storing Station 11 to ensure a continuous adequate supply thereof for the emulsification step.

Emulsification

12. In Station 6, the water phase of a suitable temperature from 38°–50° C. is stored and in Station 11, the fat phase at the same suitable temperature range is stored, and from these storing stations, the water phase and fat phase are transferred to the emulsification Station 12, where the emulsification is conducted mechanically by mixing the two phases by adding a continuous stream of the water phase to a continuous stream of the fat phase at a temperature above that at which solidification of the emulsion occurs, i.e., 38°–50° C., preferably 40°–43° C., in a proportion of 20–65% by weight water phase and 80–35% by weight fat phase. At that temperature, the water-oil-emulsion is in a molten state. The mechanical mixing is conducted with vigorous stirring, otherwise the various components do not emulsify. The fat content of the emulsion is usually controlled by the amount of water phase added to the fat phase. However, it is also possible to vary the amount of the fat phase. As necessary, a buffer storing of ready emulsion may occur at this station.

13. To the ready emulsion is optionally added aroma and flavor regulating agents which are heat-stable to pasteurization. The aroma agents may alternatively be added to the fat phase before emulsification or during the subsequent pasteurization.

14. Flash pasteurization of the ready emulsion is achieved by heating the emulsion to about 72° C. and keeping it at that temperature for about 15 seconds or by employing corresponding other time/temperature pasteurizing conditions known in the art. The flash pasteurization is conducted conventionally using heat exchangers of the scraper type, the plate type or the tube type.

15. After the pasteurizing, the molten emulsion is cooled down in to successive steps. In the first step, the composition is cooled, e.g., in a scraper heat exchanger, to its solidification temperature, e.g., 20°–14° C., while mechanically working the emulsion, thereby dispersing the water phase droplets while solidification, i.e., pre-crystallization, of the fat occurs. This achieves fire-dispersing of the water phase and gives a more durable product. Thereafter, the product is cooled down to storage temperature, e.g., 12°–8° C.

16. The refrigerated product is then packed and distributed in a conventional manner.

As evident from the above, by employing as the starting material buttermilk obtained from butter or butter oil manufacture which has a high content of proteins having good emulsion-forming properties, it is possible to substantially simplify the overall process. Additionally, a number of other advantages are obtained relative to the manufacture and the quality of the product. It is thus possible to quickly and simply manufacture a water-in-oil emulsion in a continuous process without cooling down the fat phase before the emulsification. Further, the pasteurizing is carried through at such a low temperature as 72° C. and during such a short period as 15 seconds, or other corresponding time/temperature pasteurization conditions, giving the advantage that there is no risk of denaturation of the protein or sweetmeat forming of the lactose. There are a number of advantages involved in starting with a natural product which has been soured in bacterial way, which advantages have been mentioned above. As the final product, a stable emulsion is obtained which has good durability, good taste and good temperature stability.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

50 kg. of an aqueous protein concentrate (15% protein content) having a low lactose content and obtained from soured buttermilk obtained in the manufacture of butter, was mixed with 1.2 kg. common table salt, 0.28 kg. $Na_3$-citrate-2 $H_2O$, 0.5 kg. $Na_2HPO_4.12\ H_2O$, 80 g. sorbic acid and 5 g. ascorbic acid. The pH value of the mixture was adjusted to 6.9 by adding 0.54 kg. of 50% sodium hydroxide, thus adding 8 liters of water thereto. The temperature of the ready water phase mixture was maintained at 45° C. The resulting phase was emulsified into a molten fat mixture having a temperature of 50° C. and consisting of 15 kg. soy oil, 25 kg. butter oil and 0.3 kg. of a commercially available monoglyceride mixture.

The thus-prepared molten emulsion was flash pasteurized in a reservoir at 72° C. temperature for 15 seconds and was immediately cooled down in a two-stage scraper cooler, in the first stage to a temperature of 18° C. and in the following stage to 10° C. Between the two states, the emulsion was worked in a tube having rotated metal pins.

After final cooling, a spread was obtained having a butter-like taste and appearance. The spread also showed good temperature stability and was spreadable, even at refrigerator temperature. The yield thereof corresponded to the sum of the added components.

EXAMPLE 2

60 kg. of a protein concentrate (17% protein content) according to Example 1 was mixed with 1 kg. common table salt, 0.7 kg. $Na_2HPO_4.2 H_2O$ and 100 g. sodium benzoate. The pH of the mixture was adjusted to 6.4 by adding a 40 percentage $Na_2CO_3$ solution. The procedure of Example 1 was otherwise followed. The product had a good smell and a good taste and was spreadable at refrigerator temperature.

EXAMPLE 3

54 kg. of a protein concentrate (14% protein content) according to Example 1 was mixed with 1 kg. common table salt, 0.46 kg. $Na_3PO_4$ and 0.1 kg. sodium benzoate. The pH value of the mixture was adjusted to 6.6 by adding 0.24 kg. 50% sodium hydroxide solution, thus adding 5 liters of water thereto.

The ready protein phase had a temperature of 38° C. and was mixed with a fat mixture having a temperature of 50° C. comprising 16.5 kg. soy oil, 23 kg. butter oil and 0.5 g. $\beta$-carotene. Commercially available butter aroma agents and cream aroma agents were added, and the ready emulsion was pasteurized, cooled down and worked in a scraper cooler according to Example 1.

The product obtained had a taste and an appearance similar to just-churned butter and was spreadable at refrigerator temperature. The product also kept its good appearance at temperatures between 20° and 30° C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A dairy based high protein low calorie water-in-oil emulsion spread which is spreadable at refrigerator temperatures, having a 20–65% aqueous phase with an 11 – 18% protein content provided by the protein concentrate obtained from buttermilk soured bacteriologically and buffered with citrate and phosphate buffers to a pH of between 6 and 7 whose fat content is provided by a mixture of butter oil and a polyunsaturated vegetable oil.

2. A spread according to claim 1 whose aqueous phase has a pH of 6.5 – 6.8 and whose fat phase has a 25–35% polyunsaturated fat content.

3. A spread according to claim 1 containing only those emulsifiers naturally present in the protein concentrate and having about a 40% oil phase.

4. A spread according to claim 3 wherein the major component of the oil phase is butter oil.

* * * * *